(12) United States Patent
Locke et al.

(10) Patent No.: US 12,243,038 B2
(45) Date of Patent: *Mar. 4, 2025

(54) SMART CARD NFC SECURE MONEY TRANSFER

(71) Applicant: Capital One Services, LLC, McLean, VA (US)

(72) Inventors: Tyler Locke, Washington, DC (US); Kevin Kelly, Austin, TX (US); David Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,371

(22) Filed: Sep. 19, 2023

(65) Prior Publication Data
US 2024/0029043 A1 Jan. 25, 2024

Related U.S. Application Data

(63) Continuation of application No. 17/402,687, filed on Aug. 16, 2021, now Pat. No. 11,803,832, which is a
(Continued)

(51) Int. Cl.
*G06Q 20/20* (2012.01)
*G06F 21/34* (2013.01)
(Continued)

(52) U.S. Cl.
CPC .......... *G06Q 20/204* (2013.01); *G06F 21/34* (2013.01); *G06Q 20/20* (2013.01);
(Continued)

(58) Field of Classification Search
CPC .. G06Q 20/204; G06Q 20/20; G06Q 20/3221; G06Q 20/3223; G06Q 20/3226;
(Continued)

(56) References Cited

U.S. PATENT DOCUMENTS 7,540,408 B2 6/2009 Levine et al.
7,885,870 B2 2/2011 Nam et al.
(Continued)

FOREIGN PATENT DOCUMENTS

WO 2012154915 A1 11/2012

OTHER PUBLICATIONS

Sposito, "Dynamics Vows to Adapt in World Driven by Mobile", American Banker 177.F326: 6, SourceMedia, Inc. Jul. 1 (Year: 2011).*
(Continued)

*Primary Examiner* — Frantzy Poinvil
(74) *Attorney, Agent, or Firm* — TROUTMAN PEPPER LOCKE LLP; Christopher J. Forstner; John A. Morrissett

(57) ABSTRACT

A secure method of real time money transferring between account holders utilizes Near Field Communication (NFC) technologies, dynamic transaction cards, and a mobile application to facilitate a seamless mobile transfer of funds. The dynamic transaction card of the customer requesting to make the transfer of funds may be placed in contact with the second recipient dynamic transaction card of the customer receiving the funds transfer to establish an NFC connection. The dynamic transaction card requesting the transfer may receive, via the NFC antenna on the card, the recipient customer account information stored on a passive NFC tag. The dynamic transaction card requesting the transfer may transmit the recipient account information to a mobile application, which may transmit the recipient account information to an account provider system for facilitating the funds transfer.

20 Claims, 5 Drawing Sheets

Related U.S. Application Data continuation of application No. 16/450,350, filed on Jun. 24, 2019, now Pat. No. 11,093,923, which is a continuation of application No. 15/663,083, filed on Jul. 28, 2017, now Pat. No. 10,373,146.

(60) Provisional application No. 62/440,132, filed on Dec. 29, 2016.

(51) Int. Cl.
| | | |
|---|---|---|
| *G06Q 20/32* | (2012.01) | |
| *G06Q 20/34* | (2012.01) | |
| *G06Q 20/38* | (2012.01) | |
| *G06Q 30/06* | (2023.01) | |
| *G07F 7/08* | (2006.01) | |
| *G07F 7/10* | (2006.01) | |
| *H04B 5/72* | (2024.01) | |

(52) U.S. Cl.
CPC ..... *G06Q 20/3221* (2013.01); *G06Q 20/3223* (2013.01); *G06Q 20/3226* (2013.01); *G06Q 20/3278* (2013.01); *G06Q 20/341* (2013.01); *G06Q 20/346* (2013.01); *G06Q 20/352* (2013.01); *G06Q 20/382* (2013.01); *G06Q 30/06* (2013.01); *G07F 7/084* (2013.01); *G07F 7/0846* (2013.01); *G07F 7/0866* (2013.01); *G07F 7/1008* (2013.01); *H04B 5/72* (2024.01)

(58) Field of Classification Search
CPC ............ G06Q 20/3278; G06Q 20/341; G06Q 20/346; G06Q 20/352; G06Q 20/382; G06Q 30/06; G06F 21/34; G07F 7/084; G07F 7/0846; G07F 7/0866; G07F 7/1008; H04B 5/72
USPC ...................................................... 705/3–44
See application file for complete search history.

(56) References Cited

U.S. PATENT DOCUMENTS

| | | | |
|---|---|---|---|
| 8,504,450 B2 | 8/2013 | Shastry | |
| 8,510,220 B2 | 8/2013 | Rackley, III et al. | |
| 8,612,317 B1 | 12/2013 | Harman et al. | |
| 8,615,445 B2 | 12/2013 | Dorsey et al. | |
| 8,630,947 B1 | 1/2014 | Freund | |
| 8,694,425 B2 | 4/2014 | O'Leary et al. | |
| 8,751,314 B2 | 6/2014 | Fisher | |
| 8,762,211 B2 | 6/2014 | Killian et al. | |
| 8,788,418 B2 | 7/2014 | Spodak et al. | |
| 8,805,379 B2 | 8/2014 | Brown et al. | |
| 8,805,725 B2 | 8/2014 | Calman | |
| 8,805,726 B2 | 8/2014 | Fisher | |
| 8,813,182 B2 | 8/2014 | Griffin et al. | |
| 8,903,737 B2 | 12/2014 | Cameron et al. | |
| 8,909,553 B2 | 12/2014 | Abifaker | |
| 8,978,975 B2 | 3/2015 | Barnett | |
| 9,009,081 B2 | 4/2015 | Fisher | |
| 9,026,459 B2 | 5/2015 | Fisher | |
| 9,105,025 B2 | 8/2015 | Poole et al. | |
| 9,909,879 B2* | 3/2018 | VonDerheide | G06Q 30/0222 |
| 10,664,839 B2 | 5/2020 | Modi et al. | |
| 11,055,692 B1* | 7/2021 | Bodalia | G06K 7/1417 |
| 11,605,078 B1* | 3/2023 | Adam | G06Q 20/322 |
| 11,829,999 B2* | 11/2023 | Collinge | H04W 12/04 |
| 2004/0098350 A1 | 5/2004 | Labrou et al. | |
| 2007/0295803 A1 | 12/2007 | Levine et al. | |
| 2009/0143104 A1 | 6/2009 | Loh et al. | |
| 2009/0164381 A1* | 6/2009 | Brown | G06Q 20/3672 705/65 |
| 2009/0191811 A1 | 7/2009 | Griffin et al. | |
| 2009/0192937 A1 | 7/2009 | Griffin et al. | |
| 2011/0022024 A1 | 1/2011 | VonDerheide | |
| 2011/0060684 A1 | 3/2011 | Jucht et al. | |
| 2011/0178903 A1 | 7/2011 | Adams et al. | |
| 2011/0238553 A1 | 9/2011 | Raj et al. | |
| 2012/0031545 A1 | 2/2012 | Vaccaro et al. | |
| 2012/0072350 A1 | 3/2012 | Goldthwaite et al. | |
| 2012/0136786 A1 | 5/2012 | Romagnoli et al. | |
| 2012/0310760 A1 | 12/2012 | Phillips et al. | |
| 2013/0013499 A1 | 1/2013 | Kalgi | |
| 2013/0030997 A1 | 1/2013 | Spodak et al. | |
| 2013/0060618 A1 | 3/2013 | Baron et al. | |
| 2013/0080229 A1 | 3/2013 | Fisher | |
| 2013/0097078 A1* | 4/2013 | Wong | G06Q 20/10 705/44 |
| 2013/0134216 A1 | 5/2013 | Spodak et al. | |
| 2013/0185167 A1 | 7/2013 | Mestre et al. | |
| 2013/0204697 A1 | 8/2013 | Boal | |
| 2013/0211929 A1 | 8/2013 | Itwaru | |
| 2014/0081785 A1 | 3/2014 | Valadas Preto | |
| 2014/0164154 A1 | 6/2014 | Ramaci | |
| 2014/0372308 A1 | 12/2014 | Sheets | |
| 2015/0032635 A1 | 1/2015 | Guise | |
| 2015/0134540 A1 | 5/2015 | Law | |
| 2015/0142671 A1* | 5/2015 | Dicker | G06Q 20/327 705/75 |
| 2015/0178693 A1* | 6/2015 | Solis | G06Q 20/385 705/40 |
| 2015/0186866 A1 | 7/2015 | Lund | |
| 2015/0262165 A1 | 9/2015 | Fisher | |
| 2015/0302413 A1 | 10/2015 | Dua | |
| 2015/0379283 A1 | 12/2015 | Spodak et al. | |
| 2016/0012465 A1* | 1/2016 | Sharp | G06Q 20/321 705/14.17 |
| 2016/0034877 A1 | 2/2016 | Poole et al. | |
| 2016/0086171 A1 | 3/2016 | Rehe et al. | |
| 2016/0132862 A1 | 5/2016 | Poole et al. | |
| 2016/0294727 A1* | 10/2016 | Varghese | H04W 12/08 |
| 2018/0005227 A1* | 1/2018 | Sandeløv | G06Q 20/20 |
| 2021/0406923 A1 | 12/2021 | Cherry et al. | |
| 2022/0019995 A1* | 1/2022 | Ngo | G06Q 20/385 |
| 2023/0316242 A1* | 10/2023 | Choy | G06Q 20/36 705/39 |

OTHER PUBLICATIONS

Stroka, "Ensuring Business and Payments Security", Automatic Merchandiser 61.4: 16-17, 20-21, Endeavor Business Media, August (Year: 2019).*

Extended European Search Report for corresponding Application No. 17210992 mailed Apr. 5, 2018.

"EMV—Payment Tokenisation Specification Technical Framework," Mar. 31, 2014, Retrieved from https:www.emvco.com/specifications.aspx?id=263.

Office Action in related EP Application No. 17210992.8, mailed Jan. 24, 2020.

Summers et al., "Emergence of immediate funds transfer as a general-purpose means of payment," Federal Reserve Bank of Chicago, Economic Principles 10 (Year: 2011).

Valimo: Valimo selected by Gemalto as global authentication vendor—Global reseller agreement makes Mobile ID available to everyone, M2 Presswire, Coventry, ProQuest ID: 444156883, Sep. 9 (Year: 2009).

* cited by examiner

SMART CARD NFC SECURE MONEY TRANSFER

CROSS REFERENCE TO RELATED APPLICATIONS

The subject application is a continuation of, and claims priority under 35 U.S.C. § 120 to, U.S. patent application Ser. No. 17/402,687, filed Aug. 16, 2021, which is a continuation of U.S. patent application Ser. No. 16/450,350, now U.S. Pat. No. 11,093,923, filed Jun. 24, 2019, which is a continuation of U.S. patent application Ser. No. 15/663,083, now U.S. Pat. No. 10,373,146, filed Jul. 28, 2017, which claims the benefit of U.S. Provisional Patent Application No. 62/440,132, filed on Dec. 29, 2016, the contents of which are hereby incorporated by reference in their entireties.

FIELD OF THE DISCLOSURE

The present disclosure relates to a dynamic transaction card, and systems and methods relating to the dynamic transaction card. A secure method of transferring money in real time between account holders at a financial institution utilizes Near Field Communication (NFC) technologies, dynamic transaction cards, and a mobile application to facilitate a seamless mobile transfer of funds between account holders.

BACKGROUND

Mobile applications that facilitate electronic transfers of funds have limited capabilities. Transferring funds between accounts requires accessing and transmitting substantial sensitive customer information from customers, including information about the receiving account. Using these existing systems, customers need to manually provide customer information to complete the transfer. Not only is this burdensome and time-consuming for customers, but it also leads to the possibility of a failed transfer due to the entering of incorrect customer information, which is a likely occurrence when such information is entered manually. Such transfers can also require significant action on the recipient end, such as the registration for the receipt of funds Additionally, these methods for transferring funds electronically pose great security concerns when accessing and transmitting sensitive account information, which may compromise the sensitive data. Current malware and phishing attacks can acquire this sensitive account information utilized to transfer funds electronically.

These and other drawbacks exist.

SUMMARY

Various embodiments of the present disclosure provide a dynamic transaction card, systems supporting a dynamic transaction card, and methods for operating a dynamic transaction card. Specifically, utilizing an NFC connection in combination with a mobile application, a first account holder may place a first dynamic transaction card associated with the first account in contact with a second account holder's second dynamic transaction card associated with a second account to initiate an instant transfer of funds between the first and second account.

As referred to herein, a dynamic transaction card may be understood to include a transaction card that may include a number of accounts that may be activated and/or deactivated by an account holder and/or account provider, data storage that may be updated to reflect real-time and/or on-demand account and/or transaction data, and/or display components to display the updated account and/or transaction data. A dynamic transaction card may be understood to be activated (e.g., turned on) and/or deactivated (e.g., turned off) based on input received at the dynamic transaction card as described herein.

A dynamic transaction card may include a smart card, which may be utilized to provide an instant secure money transfer between account holders without utilizing an external service other than an account provider associated with the account holders' system. A user does not need to enter any customer information because by using dynamic transaction cards to facilitate the money transfer, the customer information is obtained automatically via NFC. A customer desiring to transfer funds may utilize a mobile application of a customer mobile device that is integrated with the customer dynamic transaction card to select a transfer amount and may enable active NFC communication mode on a customer dynamic transaction card. A first customer dynamic transaction card may include a secure payment chip, which may be a EuroPay-MasterCard-Visa (EMV$^{1m}$) chip having secure memory, a microprocessor, which may include a payment processing microprocessor, a communication device which may include an antenna such as an NFC antenna, and an application processor which may store an application, which when executed may facilitate the processing of the dynamic transaction card. A second dynamic transaction card may include a secure payment chip, which may be an EMV' chip having a secure memory, a microprocessor, which may include a payment processing microprocessor, a communication device which may include an antenna such as an NFC antenna and an application processor. The respective application processor may be utilized to enable an active communication mode, which may include an active NFC communication mode, on the dynamic transaction cards.

The first customer dynamic transaction card may receive a request, via a short range wireless communication network, which may be a Bluetooth' or Bluetooth' Low Energy (BLE) network from the mobile application executed on the first customer mobile device to transfer funds from this first customer account to a second recipient customer account which is associated with a second dynamic transaction card. The application processor on the second dynamic transaction card may be utilized to generate a passive tag, which may include a passive NFC tag, which may be utilized to securely store account information in the passive tag. As such, the first dynamic transaction card of the customer requesting to make the transfer of funds may be placed in contact with the second recipient dynamic transaction card of the customer receiving the funds transfer to establish a connection, which may include an NFC connection. For example, utilizing an NFC connection, the first dynamic transaction card requesting the transfer of funds may receive, via the NFC antenna on the card, the recipient customer account information stored on the passive NFC tag.

To facilitate the mobile transfer of funds, the first dynamic transaction card requesting the transfer of funds may transmit, via a short range wireless communication network, which may be a Bluetooth' or BLE network, the recipient account information to a mobile application which may be located on a mobile device of the customer requesting the funds transfer. The mobile application may transmit the recipient account information to an account provider system via a wireless network, which may be a mobile network or WiFi. The account provider system may be utilized to transfer the requested funds from the first requesting account to the second recipient account.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION

Figure 1:
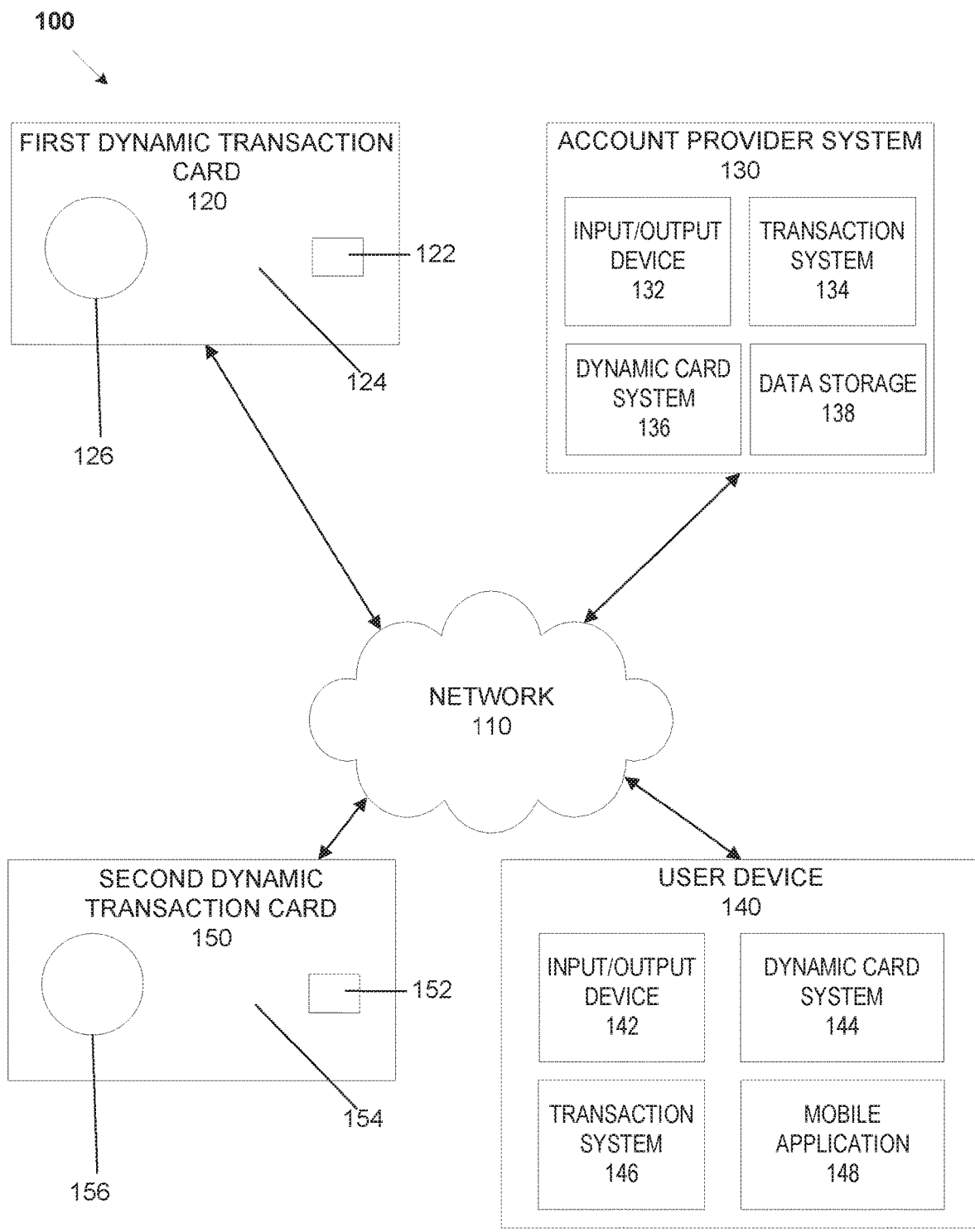
FIG. 1 depicts an example embodiment of a system including dynamic transaction cards according to embodiments of the disclosure.

The entire contents of the following applications are incorporated herein by reference: U.S. patent application Ser. No. 15/098,585 entitled "System, Method and Apparatus for a Dynamic Transaction Card" filed Apr. 14, 2016, which claims the benefit of U.S. Provisional Application No. 62/270,669 filed Dec. 22, 2015 and U.S. Provisional Application No. 62/147,568 filed Apr. 14, 2015; U.S. patent application Ser. No. 15/098,935 entitled "Dynamic Transaction Card Power Management" filed Apr. 14, 2016, which claims the benefit of U.S. Provisional Application No. 62/147,568 filed Apr. 14, 2015, U.S. Provisional Application No. 62/266,324 filed Dec. 11, 2015, U.S. Provisional Application No. 62/270,307 filed Dec. 21, 2015, and U.S. Provisional Application No. 62/305,599 filed Mar. 9, 2016; U.S. patent application Ser. No. 14/977,730 entitled "A System, Method, and Apparatus for Locating a Bluetooth Enabled Transaction Card, filed Dec. 22, 2015, which claims the benefit of U.S. Provisional Application No. 62/095,190, filed on Dec. 22, 2014; U.S. Pat. No. 9,105,025, entitled, Enhanced Near Field Communications Attachment filed on May 29, 2014, which claims the benefit of U.S. Provisional Application No. 61/570,275 filed on Dec. 13, 2011 and U.S. Provisional Application No. 61/547,910 filed on Oct. 17, 2011; U.S. patent application Ser. No. 14/338,423, entitled "System and Method for Exchanging Data with Smart Cards" filed Jul. 23, 2014, which claims the benefit of U.S. Provisional Application No. 61/857,443 filed on Jul. 23, 2013; U.S. patent application Ser. No. 15/098,830 entitled "Dynamic Transaction Card with EMV Interface and Method of Manufacturing" filed Apr. 14, 2016, which claims the benefit of U.S. Provisional Application No. 62/270,648 filed Dec. 22, 2015 and U.S. Provisional Application No. 62/147,568 filed Apr. 14, 2015; U.S. patent application Ser. No. 14/206,305 entitled "System and Method for Providing Third Party Payments with Non-Integrated Merchants" filed Mar. 12, 2014, which claims the benefit of U.S. Provisional Application No. 61/778,776 filed Mar. 13, 2015; U.S. patent application Ser. No. 14/480,842 entitled "System and Method for Automatically Authenticating a Caller" filed Sep. 9, 2014, which claims the benefit of U.S. Provisional Application No. 61/875,251 filed Sep. 9, 2013; U.S. patent application Ser. No. 15/297,453 entitled "System and Method for Automatically Authenticating a Caller" filed Oct. 19, 2016, which is a continuation and claims the benefit of U.S. patent application Ser. No. 14/480,842, which claims the benefit of U.S. Provisional Application No. 61/875,251; and U.S. patent application Ser. No. 14/827,671 entitled "System and Method for Digital Authentication" filed Aug. 17, 2015, which claims the benefit of U.S. Provisional Application No. 62/037,710 filed Aug. 15, 2014.

The following description is intended to convey a thorough understanding of the embodiments described by providing a number of specific example embodiments and details involving a dynamic transaction card and systems and methods for using a dynamic transaction card to utilize an NFC connection in combination with a mobile application to facilitate a secure instant transfer of funds.

It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. An EMV' enabled card is used as an example of a dynamic transaction card. A dynamic transaction card may include any type of transaction card that includes a microcontroller-enabled card used in any type of transaction, including, for example, debit cards, credit cards, pre-paid cards, cards used in transportation systems, membership programs, loyalty programs, hotel systems, and the like. A dynamic transaction card may include enhanced features, including hardware, software, and firmware, beyond the traditional features of a magnetic stripe or EMV' card. The use of "mobile device" in the examples throughout this application is only by way of example. Any type of device capable of communicating with a dynamic transaction card may also be used, including, for example, personal computers, tablets, gaming systems, televisions, or any other device capable of communicating with a dynamic transaction card.

According to the various embodiments of the present disclosure, a dynamic transaction card and systems and methods for using a dynamic transaction card are provided. Such embodiments may include, for example, a transaction card including various components to facilitate the notifications, alerts, and/or other output on a dynamic transaction card to an account holder associated with the dynamic transaction card. Notifications, alerts, and output may be provided in the form of LED lights and/or colors, LED lighting patterns, dot matrix displays, and/or the like, which as situated on and/or within a dynamic transaction card. Interactive elements of a dynamic transaction card may be activated, triggered, and/or made available via an input component on the dynamic transaction card. For example, a dynamic transaction card may include a capacitive touch sensor, a piezoelectric sensor, via load cells, and/or the like. These types of sensors may activate, trigger, and/or make available display and/or LED lighting information to alert and/or notify a dynamic transaction card holder.

In various embodiments, providing the alerts, notifications, and/or other output on a dynamic transaction card could be provided with the assistance of a network environment, such as a cellular or Internet network. For example, a mobile device may request and/or receive data indicative of notifications, alerts, and/or output to be displayed on a dynamic transaction card from a financial institution system via a network. A mobile device may then relay the data via a network (e.g., NFC, Bluetooth', and/or the like) to the dynamic transaction card for storage and/or to activate, trigger, and/or output notifications and/or alerts.

FIG. 1 depicts an example system 100 including a dynamic transaction card, which may utilize an NFC connection in combination with a mobile application to facilitate a secure instant transfer of funds. As shown in FIG. 1, an example system 100 may include one or more dynamic transaction cards 120, 150, one or more account provider systems 130, and one or more user devices 140.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, DAMPS, Wi-Fi, Fixed Wireless Data, IEEE 802.11b, 802.15.1, 802.11n and 802.11g, a Bluetooth™ network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

User device 140 may include, for example, one or more mobile devices, such as, for example, personal digital assistants (PDA), tablet computers and/or electronic readers (e.g., iPad', Kindle Fire™, Playbook', Touchpad', etc.), wearable devices (e.g., Google Glass™), telephony devices, smartphones, cameras, music playing devices (e.g., iPod', etc.), televisions, set-top-box devices, and the like.

Account provider system 130 and user device 140 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, account provider system may include components such as those illustrated in FIG. 2 and/or FIG. 4.

Account provider system 130 and user device 140 may include at least one central processing unit (CPU), which may be configured to execute computer program instructions to perform various processes and methods. Account provider system 130 and user device 140, may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access™ file, a solid state storage device, which may include an all flash array, a hybrid array, or a server-side product, enterprise storage, which may include online or cloud storage, or any other storage mechanism.

Account provider system 130 and user device 140 may further include, for example, a processor, which may be several processors, a single processor, or a single device having multiple processors. Although depicted as single elements, it should be appreciated that according to one or more embodiments, account provider system 130 and/or user device 140, may comprise a plurality of account provider systems 130 and/or user devices.

Account provider system 130 and user device 140 may further include data storage, such as data storage 138. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access™ file, a solid state storage device, which may include an all flash array, a hybrid array, or a server-side product, enterprise storage, which may include online or cloud storage or any other storage mechanism.

As shown in FIG. 1, each account provider system 130 and/or user device 140 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include dynamic transaction cards 120, 150. A dynamic transaction card may include any transaction card that is able to display alerts, notifications, and/or other output to a card holder via a display and/or LED lighting 126, 156 and/or receive input to interact with the dynamic transaction card via, for example, a sensor 124, 154. Although FIG. 1 depicts a single sensor, 124, 154, multiple sensors may be included in dynamic transaction card 120, 150. Dynamic transaction card 12, 150 also may be composed of various materials that enable the entire exterior surface of card 120, 150 to act as a sensor. A dynamic transaction card may be able to communicate with, for example, a mobile device using RFID, Bluetooth', NFC, WiFi Direct and/or other related technologies. For example, communications between a dynamic transaction card and a mobile device may include methods, systems, and devices described in U.S. Patent Publication No 2015-0032635 filed on Jul. 23, 2014, the entire contents of which are incorporated herein by reference.

A dynamic transaction card may be able to communicate with EMV' terminals via contact point positions on the exterior of card 120, 150, such as those positions on an EMV' standard chip card 122, 152 located on the dynamic transaction card 120, 150 or an EMV plate positions on the exterior of card 120, 150 connected to an EMV' processor within card 120, 150. For example, contact point positions on the exterior of card 120, 150 may be directly connected and adjacent to an EMV' processor (e.g., EMV' chip 122, 152). In another example, the contact point positions on the exterior of card 120, 150 may be connected to an EMV' processor using a form of wired connection (e.g., electrical wiring, plastic jumpers, and/or the like) such that the EMV' processor may be positioned at any location in the interior of card 120, 150 as described in U.S. Provisional Application 62/270,648, the entire contents of which are incorporated herein by reference.

A dynamic transaction card 120, 150 may also include hardware components to provide contactless payments and/or communications. For example, dynamic transaction card 120, 150 may include an output layer, an outer protective layer, potting, application (e.g., a Java$^{m4}$ Applet), application integration (e.g., Java Applet integration), an EMV' chip 122, 152, one or more sensors, a display, a display driver, firmware, a bootloader, a microcontroller, one or more antenna, an energy storage component, power management, a flexible PCB, a chassis, and/or card backing. An EMV' chip 122, 152 embedded in the dynamic transaction card 120, 150 may include a number of contacts that may be connected and activated using an interface device. Account provider system 130 may include systems associated with, for example, a banking service company such as Capital One®, Bank of America®, Citibank®, Wells Fargo®, Sun Trust™, various community banks, and the like, as well as a number of other financial institutions such as Visa®, MasterCard®, and American Express® that issue credit and/or debit cards, for example, as transaction cards. Account provider system 130 may include and/or be connected to one or more computer systems and networks to process transactions. For example, account provider system 130 may process transactions as shown and described in FIG. 5 below. Account provider system 130 may include systems associated with financial institutions that issue transaction cards, such as a dynamic transaction card 120, 150, and maintains a contract with cardholders for repayment. In various embodiments, an account provider system 130 may issue credit, debit, and/or stored value cards, for example. Account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.). Account provider system 130 may include an input/output device 132, a transaction system 134, a dynamic transaction card system 136, and data storage 138. Input/output device 132 may include for example, I/O devices, which may be configured to provide input and/or output to providing party system 130 (e.g., keyboard, mouse, display, speakers, printers, modems, network cards, etc.). Input/output device 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of account provider system 130, and a bus that allows communication among the various components of account provider system 130. Input/output device 132 may include a display, which may include for example output devices, such as a printer, display screen (e.g., monitor, television, and the like), speakers, projector, and the like. Although not shown, each account provider system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transaction system 134 may include various hardware and software components to communicate between a merchant, acquisition system, account provider system, and/or a user device to process a transaction, such as a user purchase. Dynamic transaction card system 136 may include various hardware and software components, such as data storage (not shown) to store data associated with a dynamic transaction card (e.g., card number, account type, account balance, account limits, budget data, recent transactions, pairing data such as time and date of pairing with a mobile device, and the like) and cardholder data (e.g., cardholder name, address, phone number(s), email address, demographic data, and the like). Data storage 138 may store data associated with an account (e.g., card number, account type, account balance, account limits, budget data, recent transactions, pairing data such as time, date, and location of pairing with a mobile device, and the like) and account holder data (e.g., account holder name, address, phone number(s), email address, demographic data, and the like).

A user device 140, may include a mobile device, and may be any device capable of communicating with a transaction card 120, 150 via, for example, Bluetooth™ technology, NFC technology, WiFi Direct technology, and/or the like and execute various functions to transmit and receive account data (e.g., card number, account type, account balance, account limits, budget data, recent transactions, and/or the like) associated with dynamic transaction card 120, 150. For example, user device 140 could be an iPhone™, iPad™ and/or Apple Watch™ from Apple® or any other mobile device running Apple's iOS operating system, any device running Google's Android® operating system, including, for example, smartphones running the Android® operating system and other wearable mobile devices, such as Google Glass™ or Samsung Galaxy Gear Smartwatch™, any device running Microsoft's Windows® Mobile operating system, and/or any other smartphone or like device.

User device 140 may include for example, an input/output device 142, a dynamic card system 144, a transaction system 146, and a mobile application 148. Input/output device 142 may include, for example, a Bluetooth' device or chipset with a Bluetooth' transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth™-related functionality may be supported using a Bluetooth™ API provided by the platform associated with the user device 140 (e.g., The Android platform, the iOS platform). Using a Bluetooth™ API, an application stored on a mobile device 140 (e.g., a banking application, a financial account application, etc.) or the device may be able to scan for other Bluetooth' devices (e.g., a dynamic transaction card 120, 150), query the local Bluetooth' adapter for paired Bluetooth™ devices, establish RFCOMM channels, connect to other devices through service discovery, transfer data to and from other devices or a transaction card 120, 150, and manage multiple connections. A Bluetooth™ API used in the methods, systems, and devices described herein may include an API for Bluetooth™ Low Energy (BLE) to provide significantly lower power consumption and allow a mobile device 140 to communicate with BLE devices that have low power requirements, such as dynamic transaction card 120, 150.

Input/output device 142 may include for example, I/O devices, which may be configured to provide input and/or output to mobile device 140 (e.g., keyboard, mouse, display, speakers, printers, modems, network cards, etc.). Input/output device 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of mobile device 140, and a bus that allows communication among the various components of mobile device 140. Input/output device 142 may include a display, which may include for example output devices, such as a printer, display screen (e.g., monitor, television, and the like), speakers, projector, and the like. Although not shown, each mobile device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output device 142 may also include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output device 142 may enable Industry Standard NFC Payment Transmission. For example, the input/output device 142 may enable two loop antennas to form an air-core transformer when placed near one another by using magnetic induction. Input/output device 142 may operate at 13.56 MHz or any other acceptable frequency. Also, input/output device 142 may provide for a passive communication mode, where the initiator device provides a carrier field, permitting answers by the target device via modulation of existing fields. Additionally, input/output device 142 also may provide for an active communication mode by allowing alternate field generation by the initiator and target devices.

Input/output device 142 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output device 142 may be capable of utilizing standardized transmission protocols, for example but not by way of limitation, ISO/IEC 14443 A/B, ISO/IEC 18092, MiFare', FeliCa', tag/smartcard emulation, and the like. Also, input/output device 142 may be able to utilize transmission protocols and methods that are developed in the future using other frequencies or modes of transmission. Input/output device 142 may also be backwards-compatible with existing techniques, for example RFID. Also, the system may support transmission requirements to meet new and evolving standards including internet based transmission triggered by NFC.

Dynamic transaction card system 144 may work with input/output device 142 to generate and receive account data associated with a dynamic transaction card 120, 150. For example, dynamic transaction card system may include various hardware and software components such as a processor and data storage to store dynamic transaction card data (e.g., cardholder name, address, phone number(s), email address, demographic data, card number, account type, account balance, account limits, budget data, recent transactions and the like).

Transaction system 146 may include various hardware and software components, such as data storage and a processor that may work with input/output device 142 to communicate between a merchant, acquisition system, account provider system, and/or a mobile device to process a transaction, such as a user purchase.

Mobile device 140 may also include various software components to facilitate the operation of a dynamic transaction card 120, 150. For example, mobile device 140 may include an operating system such as, for example, the iOS operating system from Apple, the Google Android™ operating system, and the Windows Mobile™ operating system from Microsoft. Mobile device 140 may also include, without limitation, software applications such as mobile banking applications and financial institution application to facilitate use of a dynamic transaction card 120, 150, an NFC application programming interface, and software to enable touch sensitive displays. Mobile banking applications and/or financial institution applications may be combined and/or separate from a dynamic transaction card system 144. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth' API supporting BLE, and a real-time data (RTD) API and a NFC Data Exchange Format (NDEF) API for reading/writing.

Software applications on user device 140 may include, for example, mobile application 148, which may be integrated with or separate from a mobile wallet application, which may be utilized to by a customer requesting a transfer of funds to select a transfer amount and to enable an active NFC communication mode on the associated dynamic transaction card. A customer client device 120 may communicate with account provider system 130 via mobile application 148.

Software applications on mobile device 140, such as mobile banking applications and applications associated with a dynamic transaction card 120, 150, may include card on/off features that allow a cardholder associated with a mobile device 140 to enable and disable a transaction card. For example, a card holder may use, for example, a mobile banking application stored on a user device 140 to disable and/or enable accounts associated with a dynamic transaction card 120, 150. A mobile banking application may include, for example, an application as displayed on mobile device 320 in FIG. 3. In this example, a dynamic transaction card 120, 150 may have account data pre-stored on the dynamic transaction card 120, 150 to associate a number of different accounts with the dynamic transaction card (e.g., debit card, credit card, prepaid card, and/or the like). If a card holder has a credit account established and desires to establish a debit card associated with the dynamic transaction card 120, 150, the card holder may use a mobile device 140 and/or dynamic transaction card 120, 150 to activate the inactive debit account on the dynamic transaction card 120, 150.

Dynamic transaction card 120, 150 may include firmware and/or a bootloader. A bootloader may include code to be executed as a dynamic transaction card 200 is activated and before any operating system, firmware, or other code is executed on the dynamic transaction card 120, 150. A bootloader may be activated via a sensor and energy storage component of the dynamic transaction card 120, 150. A bootloader may be activated and/or load an application and/or program upon detection that card 120, 150 has been inserted into a terminal, charger, and/or the like. A bootloader may be activated using only one technique described herein, using multiple techniques described herein, and/or using a card holder or card provider selected technique(s) described herein. A bootloader may only be active during a short interval after the card 200 powers up. Dynamic transaction card 120, 150 may also be activated using program code that may be flashed directly to a microprocessor such as a microcontroller, EMV™ processor, and/or the like. Dynamic transaction card 120, 150 may not use a bootloader but instead may cycle between a sleep state and an active state using program code and/or memory.

A dynamic transaction card 120, 150 may include a microcontroller and an antenna. An antenna may include, for example, a loop antenna, a fractal antenna, and/or the like. An antenna may transmit to and receive signals from a mobile device, such as user device 140, to conduct transactions and display data as described throughout the specification. A microcontroller may communicate with an EMV™ chip, Java™ Applet, Java™ Applet integration, sensor(s), power management, antenna, energy storage component, display, display driver, firmware, bootloader, and/or any other component of dynamic transaction card 120, 150. A microcontroller may control the card operations to conduct transactions and/or display data as described throughout this specification.

Figure 2:
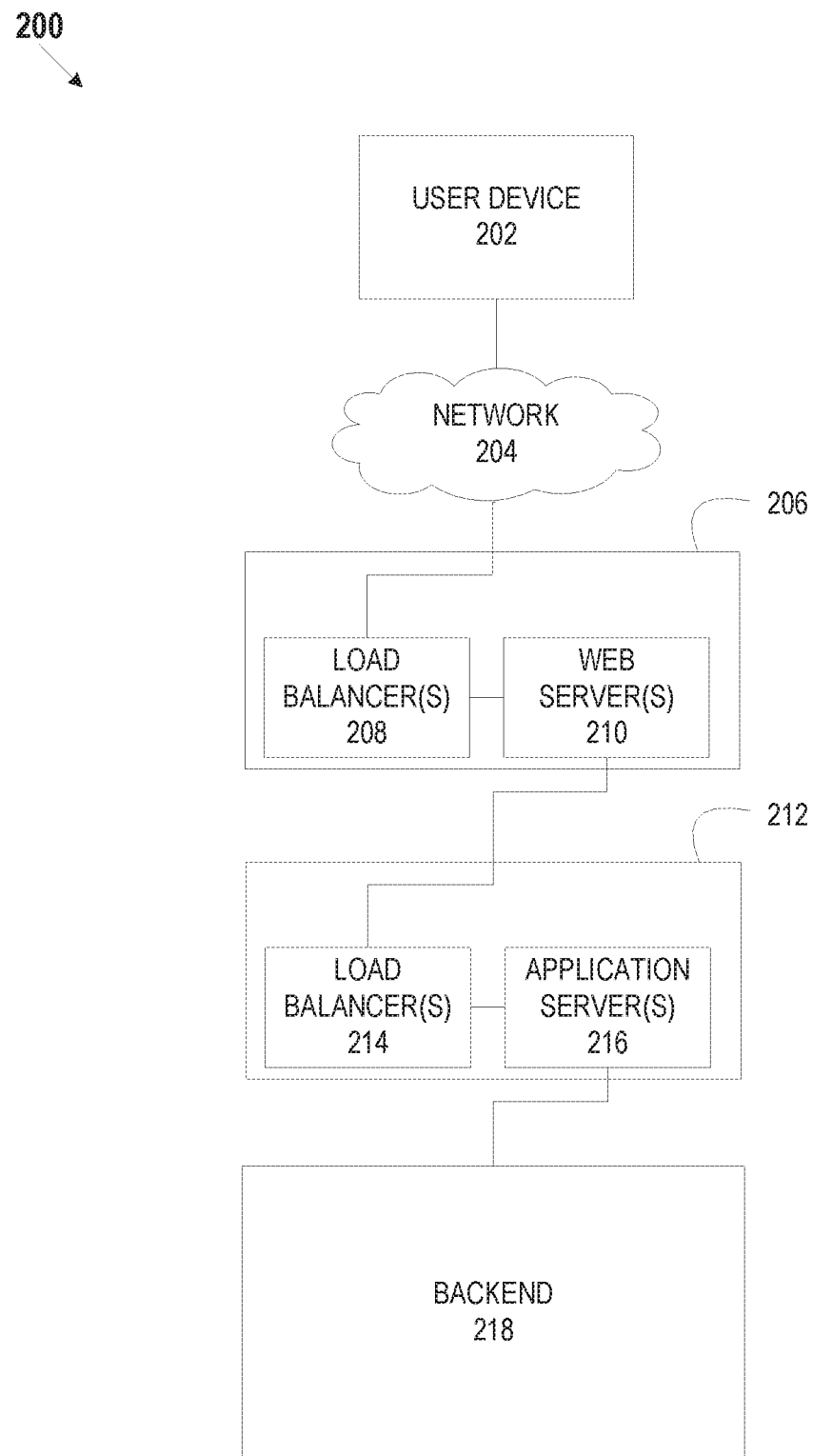
FIG. 2 depicts an example embodiment of a system including dynamic transaction cards according to embodiments of the disclosure.
Figure 4:
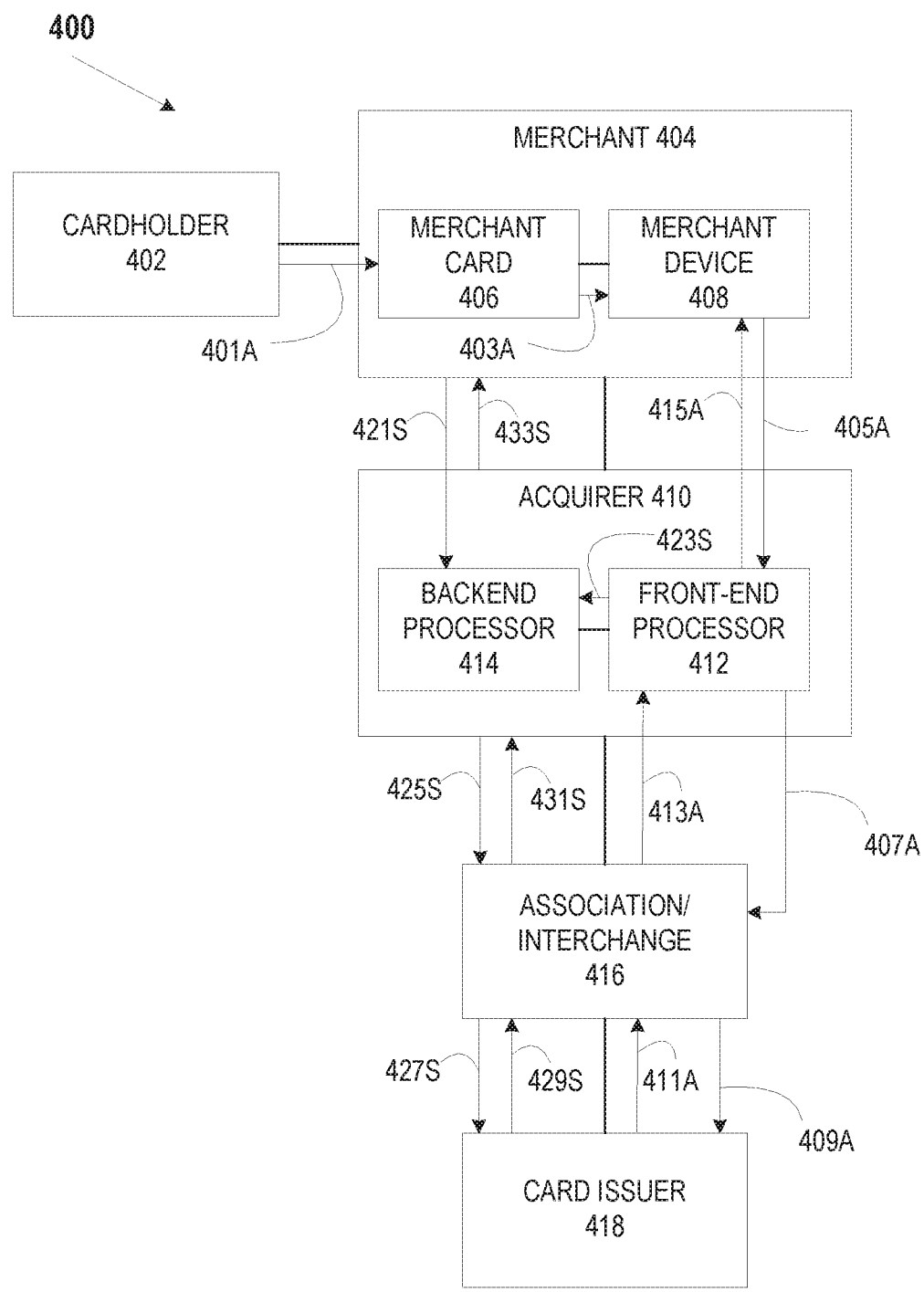
FIG. 4 depicts an example card-device linking system according to embodiments of the disclosure.

FIG. 2 illustrates a system associated with the use of a dynamic transaction card. The example system 200 in FIG. 2 may enable a financial institution, for example, to provide network services to its cardholders, and may include providing transaction card data, account data, and/or any other data to a mobile device that may in turn provide that data to a dynamic transaction card. For example, a financial institution may include a front-end controlled domain 206, a back-end controlled domain 212, and a backend 218 as part of account provider system 130, a user device 202 may include user device 140, and a dynamic transaction card may include dynamic transaction card 120, 150. Referring to FIG. 4, for example, a dynamic transaction card may be similar to a dynamic transaction card of cardholder 402; a financial institution may include a front-end controlled domain 406, a back-end controlled domain 412, and a backend 418 as part of card issuer system 418 and/or association/interchange 416; and a mobile device may be similar to a mobile device of cardholder 402.

The example system 200 also may enable a merchant, for example, to provide network services to its customers, and may include providing sales, loyalty account data, and/or any other data to a mobile device that may in turn provide that data to a dynamic transaction card. For example, a mobile device 202 and/or dynamic transaction card may interact with a merchant system, such as merchant system to send and/or receive data to the merchant system, which may interact with a financial institution over a network, where a financial institution may include a front-end controlled domain 206, a back-end controlled domain 212, and a backend 218.

System 200 may include a user device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

User device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

User device 202 may include a mobile device, and may include an iPhone™, iPod™, iPad' from Apple® or any other mobile device running Apple's iOS™ operating system, any device running Google's Android® operating system, including for example, Google's wearable device, Google Glass™, any device running Microsoft's Windows® Mobile operating system, and/or any other smartphone or like wearable mobile device. User device 202 also may be similar to user device 140 as shown and described in FIG. 1.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(s) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, user device 202, connect to access various services of a financial institution, for example. Load balancer(s) 208 may forward requests to one of the application servers 216 and/or backend 218 servers, which may then reply to load balancer 208. This may allow load balancer(s) 208 to reply to mobile device 202 without mobile device 202 ever knowing about the internal separation of functions. It also may prevent mobile devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDOS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., user device 202) through a network (e.g., network 204), such as the Internet. In various examples, web servers, may deliver web pages, relating to, for example, online banking applications and the like, to clients (e.g., user device 202). Web server(s) 210 may use, for example, a hypertext transfer protocol (HTTP/HTTPS or sHTTP) to communicate with mobile device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from mobile device 302 so mobile device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., user device 202) on the other.

Backend 218 may include hardware and/or software that enables the backend services of, for example, a financial institution, merchant, or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 218 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), and the like. Backend 218 also may be associated with one or more servers that enable the various services provided by system 200. Backend 218 may enable a financial institution to implement various functions associated with reprogramming a transaction card and/or providing data to a transaction card in order to provide a dynamic display as shown and described herein.

A dynamic display may be a display that is altered by activating new card data such as, a new card number, a new security code (e.g., CCV code), a new expiration date, and/or other card/account data. A dynamic display may be a display that is altered by activating new account data, such as a new account number, a new card number, a new security code, a new expiration date, and/or other card/account data. New account and/or new card data may be fully pre-loaded, partially pre-loaded, and/or received from a wireless connection.

For example, fully pre-loaded data may include a full account number, card number, security code, expiration date, and/or other account data that is loaded onto a dynamic transaction card (e.g., dynamic transaction card 120, 150) upon personalization at a backend facility. Fully pre-loaded data may also include an associated applet that interacts with the account and/or card data to execute transactions, manipulate dynamic displays, and/or perform any of the functionality described herein. Fully pre-loaded data may be activated upon receiving an activation signal from, for example, an account holder device via a wireless connection. A wireless device may receive an activation signal from an issuing financial institution via a network connection using, for example, a mobile application and/or mobile-enhanced website associated with the issuing financial institution.

Partially pre-loaded data may include a shell account that includes a placeholder for each type of data required for a fully-functional account (e.g., account holder data, account number, security code, expiration date, and/or the like). A placeholder may include one or more alphanumeric characters associated with inactive, null, or shell accounts in a backend system associated with the issuing financial institution. Partially pre-loaded data may include an associated applet that interacts with the account and/or card data to execute transactions, manipulate dynamic displays, and/or perform any of the functionality described herein. Partially pre-loaded data may be activated upon receiving an activation signal and/or new card or new account data from, for example, an account holder device via a wireless connection or a contact connection (e.g., using a terminal in contact with an EMV™ processor and/or other microchip). A wireless device may receive an activation signal and/or new card or new account data from an issuing financial institution via a network connection using, for example, a mobile application and/or mobile-enhanced website associated with the issuing financial institution.

Data transmitted may be encrypted. Encryption/decryption may occur using a key that was preloaded onto the dynamic transaction card upon personalization at the issuing financial institution and/or a key preloaded to an EMV™ circuit. Data received may include new account and/or card data. For example, where partially pre-loaded card and/or account data are stored on a dynamic transaction card, new card and/or account data may be received from an account holder's mobile device via a wireless connection (e.g., BLE, NFC, WiFi, and/or the like) or a contact connection (e.g., using a terminal in contact with an EMV™ processor and/or other microchip). Data received may include an applet and/or applet data required to execute transactions, manipulate dynamic displays, and/or perform any of the functionality described herein.

Also, fully pre-loaded and/or partially pre-loaded data may also include keys (e.g., public/private key pairs, private key pairs, and/or the like) that may be used by an EMV™ circuit to execute transactions using the EMV™ processor on the card.

Figure 3:
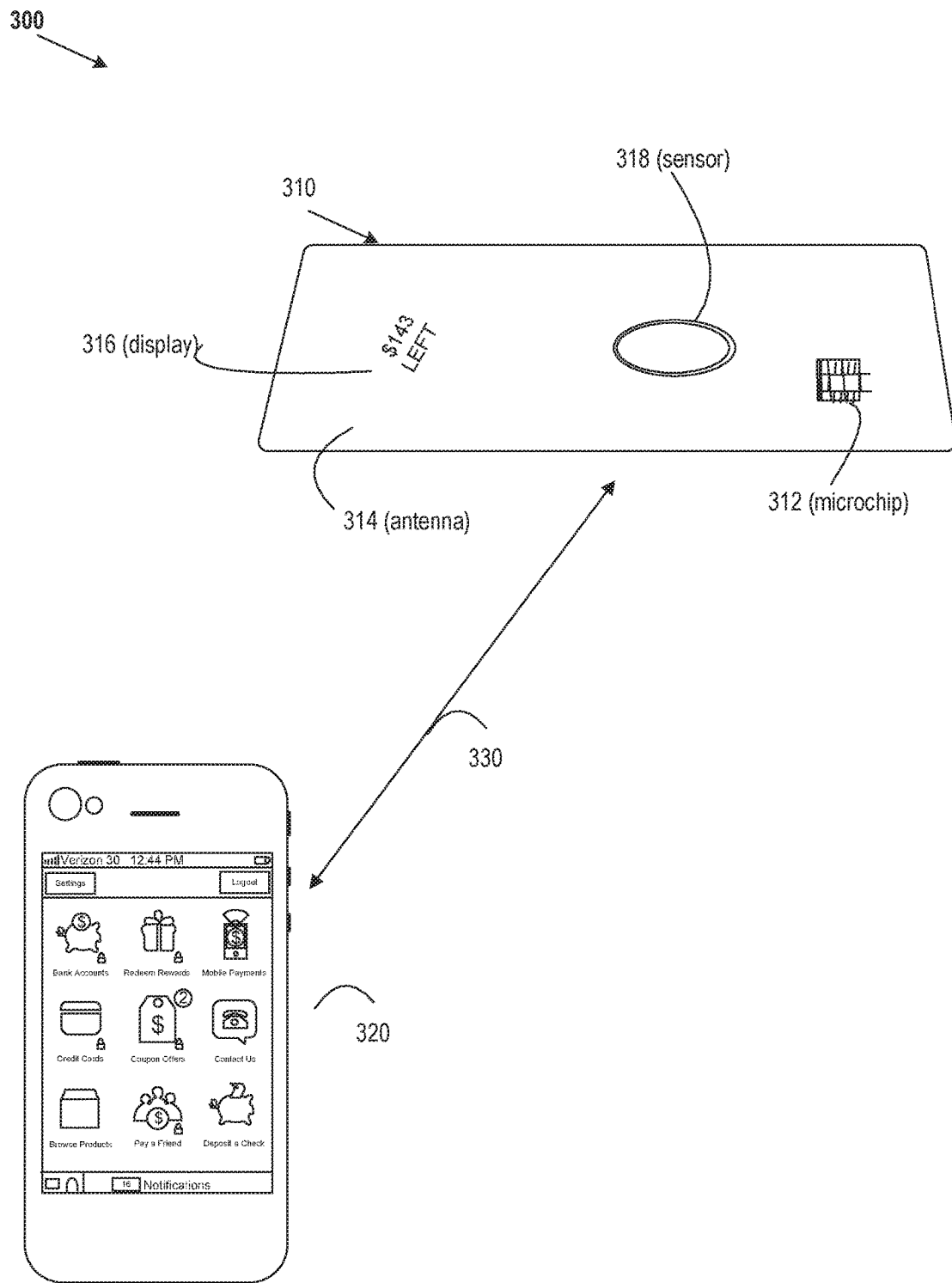
FIG. 3 depicts an example embodiment of a system including a dynamic transaction card according to embodiments of the disclosure.

FIG. 3 illustrates a system associated with the use of a dynamic transaction card. The example system 300 in FIG. 3 may enable a mobile device 320 storing a mobile banking application, for example, to provide data updates to a dynamic transaction card 310 via network 330. For example, data received at mobile device 320 may be transmitted to dynamic transaction card 310 where it is received via antenna 314. Data may be received and/or transmitted using, for example a mobile banking application that maintains and/or creates a secure connection with a financial institution to send and/or receive data related to an account associated with the financial institution. For example, a mobile banking application may include send and/or receive data related to a credit account, a debit account, a prepaid account, a loyalty account, a rewards account, and/or the like. Data may also include track data that may be updated upon demand.

A mobile application may be utilized by a customer to select a transfer amount when making a request to transfer funds to another accountholder. The mobile application may also be utilized to activate active NFC communication mode on a dynamic transaction card. The mobile application may communicate with a dynamic transaction card via Bluetooth™ or BLE, and may communicate with the backend account provider system via mobile networks or WiFi.

Upon activation of dynamic transaction card via, for example, a sensor 318, a data request may be transmitted to a mobile device 320 for updated information, where mobile device 320 may request updated data from a financial institution (not shown). Data received at dynamic transaction card 310 may be stored on microchip 312 and/or may be displayed via display 316.

FIG. 4 illustrates an example system 400 and method for a secure mobile monetary transfer. As shown and described in FIG. 4, account holders, such as account holders associated with a dynamic transaction card similar to dynamic transaction card 120, 150 and/or a mobile device similar to mobile device 140 and financial institutions similar to account provider system 130 may be connected with a card association network to enable secure transactions, timely payments, and successful withdrawals. System 400 may include a cardholder 402, merchant 404, Acquirer 410, Association/Interchange 416, and card issuer 418.

Cardholder 402 may be any account holder, including a credit card holder, debit card holder, stored value card holder and the like. Cardholder 402 may be similar to the card holder associated with dynamic transaction card 120, 150 and/or mobile device 140. Cardholder 402 may possess a plastic card or carry a device (e.g., a mobile device) that securely stores card credentials and is capable of transmitting the card credentials to, for example, a merchant system (e.g., merchant card 406) and/or an input/output device. Cardholder 402 may interact with a merchant and/or a providing party (e.g., merchant 404) by presenting a transaction card (e.g., dynamic transaction card 120, 150) or card credentials to a merchant (e.g., merchant card 406). Merchant 404 may be any merchant that accepts payment from a cardholder 402 in exchange for goods, for example. Merchant 404 may be any retailer, service provider, business entity, or individual that accepts payments. Merchant 404 may include software, firmware and hardware for accepting and/or processing payments. For example, as illustrated in FIG. 4, merchant 404 may include a merchant card 406 and a merchant device 408, which may include a payment gateway. Terminal 406 and payment gateway 408 may comprise the physical or virtual device(s) used by merchant 404 to communicate information to front-end processor 412 of acquirer 410. In various embodiments, payment gateway 408 may be an e-commerce application service provider service that authorizes payments for merchants. As such, payment gateway 408 may be a virtual equivalent of a PoS terminal and interface with, for example, a billing system of merchant 404 and pass data to front-end processor 412 of acquirer 410.

For example a merchant may utilize a merchant smart card to facilitate a payment from an account holder by use of an account holder dynamic transaction card using the secure money transfer methods described herein.

Acquirer 410 may be, for example, a financial institution or bank that holds the contract for providing payment processing services to merchant 404. Merchant 404 may have a merchant account that may serve as a contract under which Acquirer 410 may extend a line of credit to a merchant who wishes to accept, for example, credit card transactions. As shown in FIG. 4, Acquirer 410 may be associated with front-end processor 412 and back-end processor 414.

In various examples, front-end processor 412 may be a platform that card terminal 406 and/or payment gateway 408 communicate with when approving a transaction. Front-end processor 412 may include hardware, firmware, and software to process transactions. Front-end processor 412 may be responsible for the authorization and capture portion of credit card transaction. Front-end processor 412 also may include additional front-end platform interconnections to support, for example, ACH and debit transactions.

Backend processor 414 may be a platform that takes captured transactions from front-end processor 412 and settles them through an Interchange system (e.g., association/interchange 416). Back-end processor 414 may generate, for example, daily ACH files for merchant settlement. Back-end processor 414 also may handle chargeback handling, retrieval request and monthly statements.

Association/interchange 416 may be the consumer payment system whose members are the financial institutions that issue payment cards and/or sign merchant to accept payment cards. Example associations/interchanges 416 may include, Visa®, MasterCard®, and American Express®. Association/interchange 416 may include one or more computer systems and networks to process transactions.

Issuer 418 may be a financial institution that issues payment cards and maintains a contract with cardholders for repayment. In various embodiments, issuer 418 may issue credit, debit, and/or stored value cards, for example. Example issuers may include, Capital One®, Bank of America®, Citibank®, Sun Trust®, and the like.

In various embodiments, processing a payment card transaction may involve two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 402 may present payment card, such as dynamic transaction card 120, 150, as payment (401A) at merchant 404 PoS terminal 406, for example. Merchant 404 may enter card into a physical PoS terminal 406 (e.g., an $EMV^{1m}$ terminal) or submit a credit card transaction to a payment gateway 408 on behalf of withdrawing party 402 via secure connection from a Web site, retail location, or a wireless device.

Payment gateway 408 may receive the secure transaction information (403A) and may pass the secure transaction information (405A) via a secure connection to the merchant acquirer's 410 front-end processor 412.

Front-end processor 412 may submit the transaction (407A) to association/interchange 416 (e.g., a network of financial entities that communicate to manage the processing, clearing and settlement of credit card transactions). Association/interchange 416 may route the transaction (409A) to the customer's Issuer 418. Issuer 418 may approve or decline the transaction and passes the transaction results back (411A) through association/interchange 416. Association/interchange then may relay the transaction results (413A) to front-end processor 412.

Front-end processor 412 may relay the transaction results (415A) back to the payment gateway 408 and/or terminal 406. Payment gateway 408 may store the transaction results and sends them to merchant 404. Merchant 404 may receive the authorization response and complete the transaction accordingly.

During settlement, merchant 404 may deposit the transaction receipt (421S) with acquirer 410 via, for example, a settlement batch. Captured authorizations may be passed (923S) from front-end processor 412 to the back-end processor 414 for settlement. Back-end processor may generate ACH files for merchant settlement. Acquirer may submit settlement files (425S, 427S) to Issuer 418 for reimbursement via association/interchange 416. Issuer 418 may post the transaction and/or withdrawal and pay merchant 404 (429S, 431S, 433S).

Figure 5:
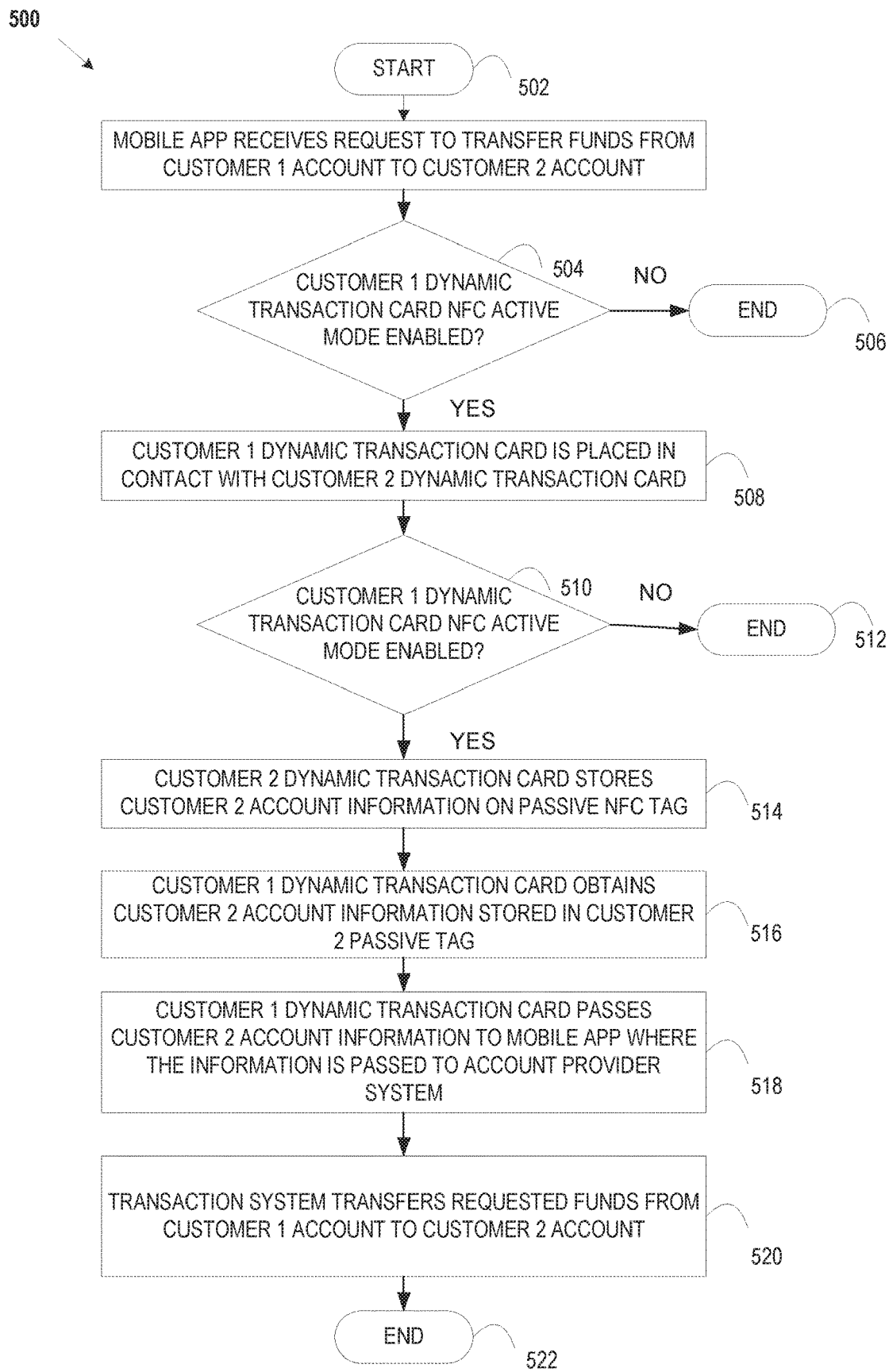
FIG. 5 depicts an example method for using dynamic transaction cards according to embodiments of the disclosure.

FIG. 5 illustrates an example method of utilizing an NFC connection in combination with a mobile application to facilitate a secure real time transfer of funds between accounts. The method 500 may start at block 502. At block 504, a mobile application on a customer mobile device of a customer desiring to transfer funds may receive a request to transfer funds from a first customer account (customer 1) to a second customer account (customer 2). A customer desiring to transfer funds may utilize a mobile application on a customer mobile device that is integrated with the customer dynamic transaction card to select a transfer amount and may enable active NFC communication mode on a customer dynamic transaction card. The recipient of the funds may utilize a mobile application on a second customer mobile device, which via a push notification, may receive a notification from the mobile application on the first customer mobile device that a request has been made to transfer funds to the second recipient customer. The mobile application may prompt the second recipient customer to select an account to which the money may be transferred. Additionally, the second recipient customer may utilize the mobile application to set a default account for money transfers that may be stored in a user profile generated for the second recipient customer and may be stored on the account provider system data storage.

The customer dynamic transaction cards may include a front-end NFC chipset and a loop antenna, which may include a 13.56 MHz loop antenna. The customer dynamic transaction cards may receive a request, via a Bluetooth' or Bluetooth' Low Energy (BLE) network from the mobile application executed on the customer mobile device to transfer funds from this first customer account to a second recipient customer account which is associated with a second dynamic transaction card. The customer mobile device may receive a response from the customer dynamic transaction card confirming a wireless connection between the two devices. The wireless connection may be using NFC technologies, Bluetooth' technologies, and/or BLE technologies as described herein.

In an exemplary embodiment, the system may enable Industry Standard NFC Transmission. For example, an NFC attachment, included on the dynamic transaction cards, may enable two loop antennas to form an air-core transformer when placed near one another by using magnetic induction. The system may operate at 13.56 MHz or any other acceptable frequency. Also, the attachment may provide for a passive communication mode, where the initiator device provides a carrier field, permitting answers by the target device via modulation of existing fields. Additionally, the attachment may also provide for an active communication mode by allowing alternate field generation by the initiator and target devices.

To utilize dynamic transaction cards to facilitate the mobile money transfer, the active NFC communication mode must be enabled for the dynamic transaction cards. The system may evaluate whether the active NFC communication mode is enabled for the first customer dynamic transaction card at block 504, and for the second customer dynamic transaction card at block 510. As such if the active NFC communication mode for the first dynamic transaction card is not enabled, the process may end at block 506. If the active communication mode for the second dynamic transaction card is not enabled, the process may end at block 512.

Based on the operating system of a mobile device, a mobile application on the device may have both an active NFC mode and a passive/reader NFC mode, or may be limited to only having a passive/reader NFC mode. As such a mobile device having only a passive reader mode may not be utilized to facilitate a mobile funds transfer. However, the system configuration described herein utilizing dynamic transaction cards in conjunction with a mobile application transforms the mobile application to an interoperable application that may be utilized across different operating systems, providing an operating system neutral mobile funds transfer system.

At block 508, the first customer dynamic transaction card of the customer requesting to make the transfer of funds may be placed in contact with the second recipient customer dynamic transaction card of the recipient customer receiving the funds transfer to establish an NFC connection. The first customer dynamic transaction card may receive a response from the second recipient customer dynamic transaction card confirming an NFC connection between the two cards.

At block 514 the application processor on the second recipient customer dynamic transaction card may be utilized to generate a passive NFC tag, which may be utilized to securely store second customer account information in the passive NFC tag. As such, sensitive customer account information does not need to be entered to facilitate the funds transfer and may be obtained through the NFC connection. Utilizing this NFC connection, the first customer dynamic transaction card requesting the transfer of funds may obtain, via the NFC antenna on the card, the recipient customer account information stored on the passive NFC tag at block 516. A user may be issued a unique identified stored on the dynamic transaction card's NFC tag rather than storing personal information such as a customer name, zip code, email address, etc.

At block 518, to facilitate the mobile transfer of funds, the first dynamic transaction card requesting the transfer of funds may transmit, via a Bluetooth' or BLE network, the recipient account information to a mobile application which may be located on a mobile device of the customer requesting the funds transfer. The mobile application may transmit the recipient account information to an account provider system via a mobile network or WiFi, where the information may be passed and queued on the backend account provider system to complete the transfer. The transaction system of the account provider system may be utilized to transfer the requested funds from the first requesting customer account to the second recipient customer account at block 520. A destination API may be utilized in order to provide a confirmation regarding the transfer of funds to, for example, a source financial institution. The process may end at block 522. The transaction system may transmit a message to the account provider system notifying the account provider of the funds transfer. The notification may be utilized by the account provider system to update the associated account balances to reflect the transfer of funds.

The request for a mobile funds transfer may be processed using the systems described in FIGS. 1, 2, 3, 4, Data may be securely transmitted between a mobile device 302 and a financial institution. Moreover, a mobile banking application and/or a financial institution application may provide a secure connection and/or security features (e.g., cryptographic keys, protocol, hash algorithm, digital signatures, passwords, checksums, and/or the like) to conduct secure communications with a financial institution backend and receive updated financial data to transmit, via RFID, BLE, Bluetooth', NFC, and/or the like, to a dynamic transaction card for storage and/or display.

For example, a mobile application may communicate with a backend account provider system via a mobile network or WiFi to pass customer/account information to the backend to facilitate the transfer of funds. Customer account information may be encrypted to facilitate a secure transfer of the information. The transmitted information may include a key or token of encrypted information representing a financial account, the amount of the transaction and/or other information necessary to facilitate the transfer of funds. The backend account provider system may verify the customer account information, as it may use the customer account information to look up the account of the customer and determine whether the transfer of funds should be authorized. The account provider system may check the account information against certain parameters to determine, for example, whether the transfer complies with certain parameters, and/or whether the associated token has expired.

An API may also encrypt, for example account and routing numbers to ensure that any passing customer account identifying data is secure during transmission and storage. The data may be read and encrypted using a private key stored within the dynamic transaction card processor. First device also may store instructions to encrypt and/or encode data being transmitted from the first device. A first device may store instructions to decrypt and/or decode data received at the first device. A first device may store encryption/encoding/decryption/decoding instruction in a secure element or a secure microprocessor. For example, where a first device includes an EMV™ chip, encryptions/encoding/decryption/decoding instructions may be stored within the EMV™ chip. A first device may store instructions to validate a public/private key handshake between the first device and a second device to pair the first device and second device via a Bluetooth™/BLE connection.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, cither of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A user device, comprising:
   one or more processors; and
   a memory in communication with the one or more processors and storing instructions that, when executed by the one or more processors, are configured to cause the user device to:
   receive a request to transfer funds from a first account associated with a first dynamic transaction card to a second recipient account associated with a second recipient dynamic transaction card;
   transmit, via a short-range wireless communication network protocol, the request to the first dynamic transaction card;
   receive second recipient account information associated with the second recipient dynamic transaction card;
   retrieve a private key from the first dynamic transaction card;
   encrypt the second recipient account information using the private key to create a second recipient account information token; and
   transmit the second recipient account information token to an account provider system over a wireless communication protocol to facilitate the transfer of the funds from the first account to the second recipient account when the second recipient account information token has not expired.

2. The user device of claim 1, wherein the user device comprises a mobile device.

3. The user device of claim 1, wherein the short-range wireless communication network comprises a Bluetooth™ or Bluetooth™ Low Energy (BLE) network.

4. The user device of claim 1, wherein encrypting the second recipient account information uses at least one encryption technique of a cryptographic key, a hash algorithm, a digital signature, and a checksum.

5. The user device of claim 1, wherein the account provider system is further configured to receive a message notifying the account provider system that a funds transfer has occurred from the first account to the second recipient account.

6. The user device of claim 5, wherein the account provider system is further configured to update an account balance of the first account based on the message.

7. The user device of claim 1, wherein a destination application programming interface (API) is configured to provide a confirmation to the account provider system that a funds transfer has been completed between the first account and the second recipient account.

8. The user device of claim 1, wherein the encryption is conducted via an application programming interface (API).

9. The user device of claim 1, wherein the request is received via a secure mobile application.

10. The user device of claim 9, wherein the second recipient account information token is transmitted to the account provider system via the secure mobile application.

11. A method, comprising:
    receiving a request to transfer funds from a first account associated with a first dynamic transaction card to a second recipient account associated with a second recipient dynamic transaction card;
    transmitting, via a short-range wireless communication network protocol, the request to the first dynamic transaction card;
    receiving second recipient account information associated with the second recipient dynamic transaction card;
    retrieving a private key from the first dynamic transaction card;
    encrypting the second recipient account information using the private key to create a second recipient account information token; and
    transmitting the second recipient account information token to an account provider system over a wireless communication network protocol to facilitate the transfer of the funds from the first account to the second recipient account when the second recipient account information token has not expired.

12. The method of claim 11, wherein the short-range wireless communication network comprises a Bluetooth™ or Bluetooth™ Low Energy (BLE) network.

13. The method of claim 11, wherein encrypting the second recipient account information uses at least one encryption technique of a cryptographic key, a hash algorithm, a digital signature, and a checksum.

14. The method of claim 11, wherein the account provider system is further configured to receive a message notifying the account provider system that a funds transfer has occurred from the first account to the second recipient account.

15. The method of claim 14, wherein the account provider system is further configured to update an account balance of the first account based on the message.

16. The method of claim 11, wherein a destination application programming interface (API) is configured to provide a confirmation to the account provider system that a funds transfer has been completed between the first account and the second recipient account.

17. A method comprising:
    receiving request to transfer funds from a first account associated with a first dynamic transaction card to a second recipient account associated with a second recipient dynamic transaction card;
    transmitting, via a short-range wireless communication network protocol, the request to the first dynamic transaction card;
    receiving second recipient account information associated with the second recipient dynamic transaction card;
    retrieving a private key from the first dynamic transaction card;
    encrypting the second recipient account information using the private key to create a second recipient account information token; and
    transmitting the second recipient account information token to an account provider system to facilitate the transfer of the funds from the first account to the second recipient account.

18. The method of claim 17, wherein the account provider system is further configured to receive a message notifying the account provider system that a funds transfer has occurred from the first account to the second recipient account.

19. The method of claim 18, wherein the account provider system is further configured to update an account balance of the first account based on the message.

20. The method of claim 17, wherein a destination application programming interface (API) is configured to provide a confirmation to the account provider system that a funds transfer has been completed between the first account and the second recipient account.

\* \* \* \* \*